United States Patent

Schofield et al.

[11] Patent Number: 5,943,462
[45] Date of Patent: Aug. 24, 1999

[54] FIBER OPTIC STUB ASSEMBLY HAVING A WATER RESISTANT BARRIER AND METHOD FOR MANUFACTURING THE SAME

[75] Inventors: Philip W. Schofield, Oak Park; David E. Wuestmann, Harwood Heights, both of Ill.

[73] Assignee: Methode Electronics, Inc., Chicago, Ill.

[21] Appl. No.: 08/968,294

[22] Filed: Nov. 12, 1997

[51] Int. Cl.⁶ .................................................. G02B 6/44
[52] U.S. Cl. ........................... 385/100; 385/81; 385/139
[58] Field of Search .................. 385/76–78, 81, 385/86, 87, 100, 138, 139

[56] References Cited

U.S. PATENT DOCUMENTS

| | | | |
|---|---|---|---|
| 4,230,395 | 10/1980 | Dean et al. | 350/96.23 |
| 4,616,900 | 10/1986 | Cairns | 350/96.2 |
| 4,666,242 | 5/1987 | Cairns | 350/96.21 |
| 4,932,746 | 6/1990 | Calzolari et al. | 350/96.23 |
| 5,185,844 | 2/1993 | Bensel, III et al. | 385/135 |
| 5,217,808 | 6/1993 | Cobb | 428/392 |
| 5,224,187 | 6/1993 | Davisdon | 385/87 |
| 5,245,134 | 9/1993 | Vana, Jr. et al. | 174/117 F |
| 5,249,248 | 9/1993 | Arroyo et al. | 385/113 |
| 5,271,081 | 12/1993 | Khalil | 385/112 |
| 5,289,556 | 2/1994 | Rawlyk et al. | 385/112 |
| 5,373,100 | 12/1994 | Arroyo et al. | 174/23 R |
| 5,416,874 | 5/1995 | Giebel et al. | 385/100 |
| 5,425,121 | 6/1995 | Cooke et al. | 385/112 |
| 5,567,174 | 10/1996 | Ericson, Jr. et al. | 439/462 |
| 5,838,861 | 11/1998 | Bunde | 385/100 |

Primary Examiner—John D. Lee
Assistant Examiner—Victoria D. Hao
Attorney, Agent, or Firm—David L. Newman

[57] ABSTRACT

A cable assembly fitting is provided to connect fiber optic to optoelectronic equipment. An elongated housing includes a front end, a back end and an axial bore extending between the front and back ends. The axial bore further defines a first portion, a second portion, and an intermediate stepped portion. A cap is fit into the back end of the housing. Fiber optic cable is contained within a cable jacket and has fibers protruding therefrom. The fibers have a mediate span and rigid sleeve thereon. A water impervious barrier is positioned adjacent the rigid sleeve. A shrink tubing is disposed around the fiber optic cable.

33 Claims, 5 Drawing Sheets

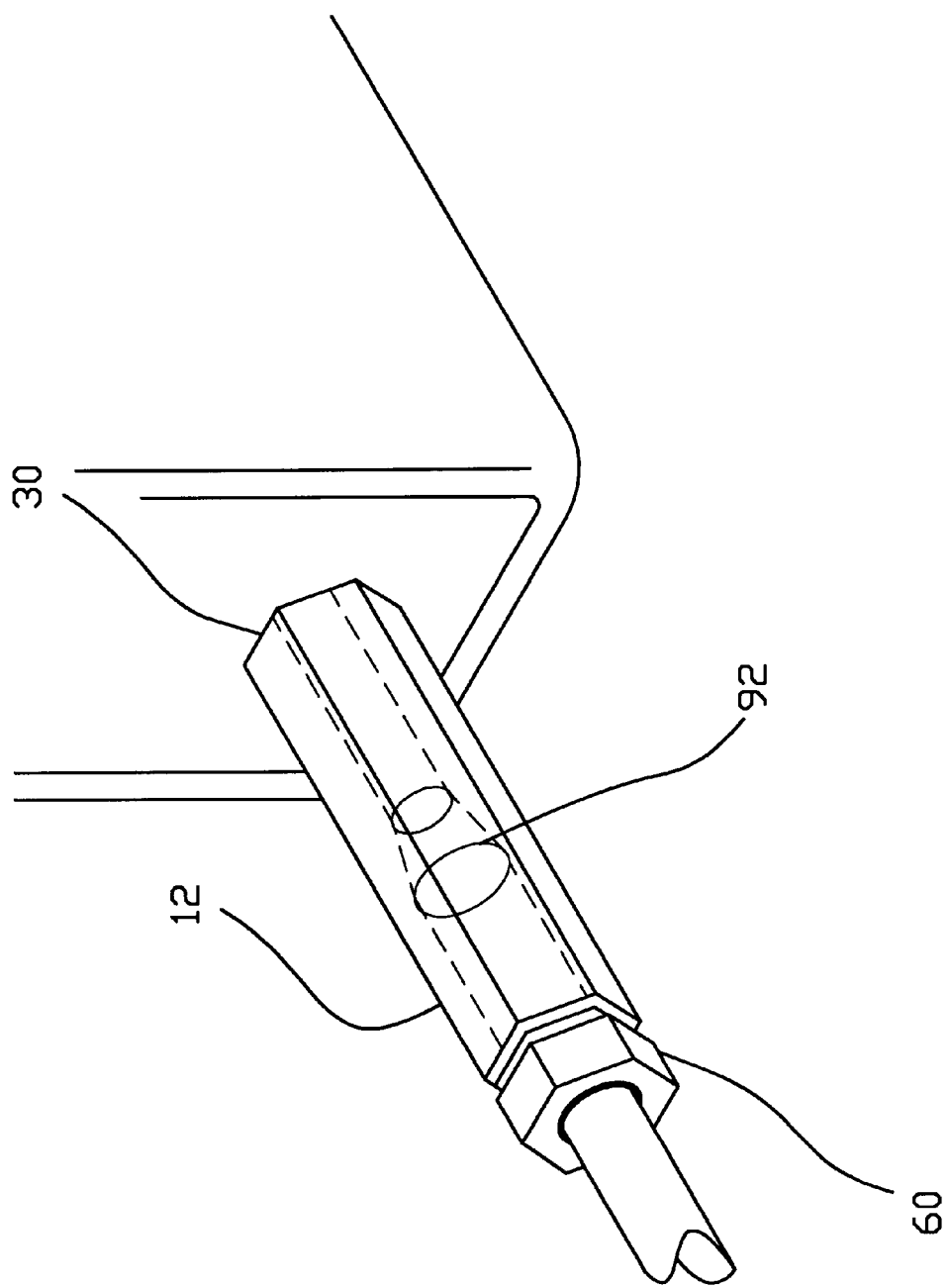

FIBER OPTIC STUB ASSEMBLY HAVING A WATER RESISTANT BARRIER AND METHOD FOR MANUFACTURING THE SAME

BACKGROUND OF THE INVENTION

The present invention generally relates to an optical cable fitting assembly. More specifically, the present invention relates to an optical cable fitting assembly in which fiber optic cable is carried to various fiber optic or optoelectronic equipment. The present invention further provides a method for manufacturing a fiber optic cable assembly.

Optical cables include cables having at least one optical fiber of glass or other transmissive dielectric material. Fiber optic fitting assemblies are generally known for use in interconnecting optical cables to optoelectronic equipment. Problems may often occur during the manufacture, termination and installation of the fiber optic fitting assemblies. The optical fibers, when stripped from the cable jacket, are extremely fragile making it difficult to work with the fiber optic cable when assembling fittings around the end of the cable. In addition, the optical fibers should not be exposed to harmful environmental conditions such as moisture, dust and dirt. Exposure to these environmental conditions may result in poor optical performance and diminished service life.

To this extent, the manufacture of a cable fitting assembly for fiber optic cable that can provide effective sealing from the environment at a reasonable cost has been difficult. Existing practices include connectors secured directly onto the cable and terminated into a port of an optoelectronic system. However, these assemblies do not provide sufficient sealing protection from water, dust and dirt either within the connector or between the assembly and the optoelectronic equipment.

A need, therefore, exists for an improved optical cable fitting assembly as well as a method for manufacturing the same.

SUMMARY OF THE INVENTION

The present invention provides a fiber optic stub cable assembly for use with optoelectronic equipment. Moreover, the present invention provides a method for manufacturing fiber optic stub cable assemblies.

To this end, in an embodiment of the present invention, a fiber optic stub cable assembly includes an elongated housing, a cap, water resistant barrier(s) and fiber optic cable. The elongated housing has a front end, a back end and an axial bore extending between the front end and the back end. The cap is fitted into the back end of the housing. A fiber optic cable is contained within a cable jacket and having fibers protruding therefrom, the fibers having a mediate span and a rigid sleeve thereon wherein the fiber optic cable is constructed and arranged within the cap and the elongated housing. A first water resistant barrier is positioned substantially surrounding the rigid sleeve and includes a shrink tubing that is disposed around the fiber optic cable.

In an embodiment, the rigid sleeve is a strain relief secured to the fiber optic cable.

In an embodiment, a grommet is within the intermediate stepped portion of the axial bore.

In an embodiment, a second water resistant barrier is positioned adjacent the rigid sleeve on an opposed side of the rigid sleeve to the first water resistant barrier.

In an embodiment, a buffer tubing is disposed around the fibers, and the shrink tubing is positioned within the grommet.

In an embodiment, a buffer tubing is placed over the fibers, a spiral wrap is positioned around the buffer tubing, and a shrink tubing is disposed around the spiral wrap wherein the buffer tubing, spiral wrap and shrink tubing form a second water resistant barrier.

In an embodiment, a grommet is positioned within the intermediate portion, and a shrink tubing is disposed around the fibers and is positioned within the grommet.

In an embodiment, the front end of the housing is connectable to an optoelectronic system.

In an embodiment of the present invention, a method for assembling a fiber optic stub fitting is provided. The method comprises the steps of: providing a fiber optic cable so that fibers extend beyond an end of a cable jacket; providing a cap; providing a rigid sleeve; inserting the fibers through the cap and the rigid sleeve; providing a first shrink tubing disposed around a first portion of the fibers, the cable jacket and the rigid sleeve; providing an optic stub housing; and inserting the fibers through the optic stub housing, creating a water resistant barrier(s) within the optic stub housing.

In an embodiment, the method includes providing a grommet within the optic stub housing, and positioning the second shrink tubing within the grommet.

In an embodiment, the method includes providing a second shrink tubing disposed around a second portion of the fibers.

In an embodiment, the method includes positioning the second shrink tubing within a grommet and compressing the grommet within the optic stub housing.

In an embodiment, the method includes inserting the cap within the optic stub housing.

In an embodiment, the method includes crimping the plurality of fibers and the cable jacket before securing the first shrink tubing.

In an embodiment, the method includes positioning an inner crimp sleeve around the fibers and under the cable strength members, positioning an outer crimp sleeve over the cable strength members and the fibers, and crimping the inner crimp sleeve, the outer crimp sleeve, the stripped fibers and the cable strength members.

In an embodiment, the method includes placing the secondary buffer tubing over each of the fibers, and positioning spiral wrap around the buffer tubing.

It is, therefore, an advantage of the present invention to provide a fiber optic cable assembly and a method for manufacturing the same that includes sealing features to shield the optical fibers from harmful environmental conditions.

Another advantage of the present invention is to provide a fiber optic cable assembly and a method for manufacturing the same that inhibits or prevents moisture from entering into the fiber optic cable assembly and the optoelectronic system.

Another advantage of the present invention is to provide a fiber optic cable assembly and a method for manufacturing the same that provides bend relief to the optical fibers which then project from the elongated housing.

Yet another advantage of the present invention is to provide a fiber optic cable assembly and method for manufacturing the same that eliminates a plug structure to encapsulate the cable sheath, mediate span of fibers and flexible buffer tubes with a potting compound thereby reducing the manufacturing time and cost.

A still further advantage of the present invention is to provide a fiber optic cable assembly and a method for manufacturing the same that reduces damage caused by rotation of the fiber optic cable during assembly and installation.

Moreover, an advantage of the present invention is to provide a fiber optic cable assembly and a method for manufacturing the same that reduces damage to the optoelectronic equipment during the connection of the fiber optic cable by providing connectable features that have stopping mechanisms.

These and other advantages of the present invention are described in and are set forth below in the following detailed description of the presently preferred embodiments and from the drawings.

BRIEF DESCRIPTION OF THE DRAWINGS

FIG. 4 is a perspective view of an embodiment of the fiber optic stub assembly of the present invention installed in an optoelectronic system.

DETAILED DESCRIPTION OF THE PRESENTLY PREFERRED EMBODIMENTS

Figure 1:
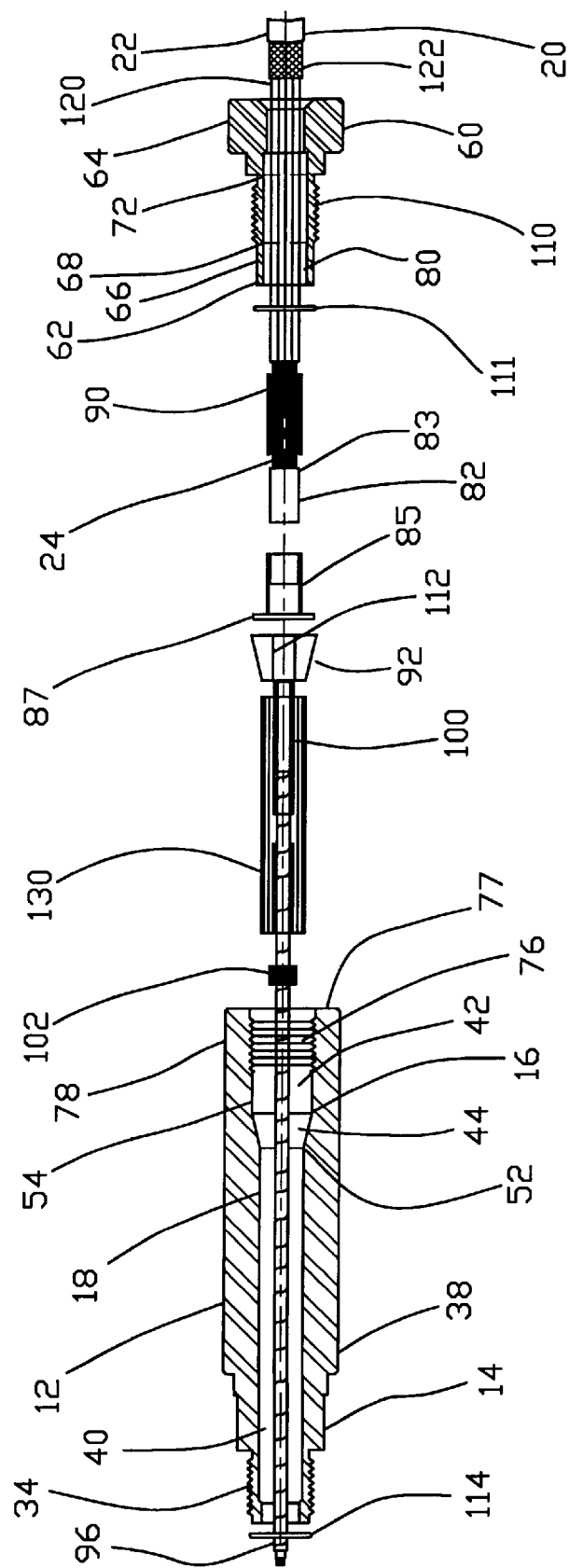
FIG. 1 is a sectional view of an embodiment of a fiber optic stub assembly of the present invention.
Figure 2A:
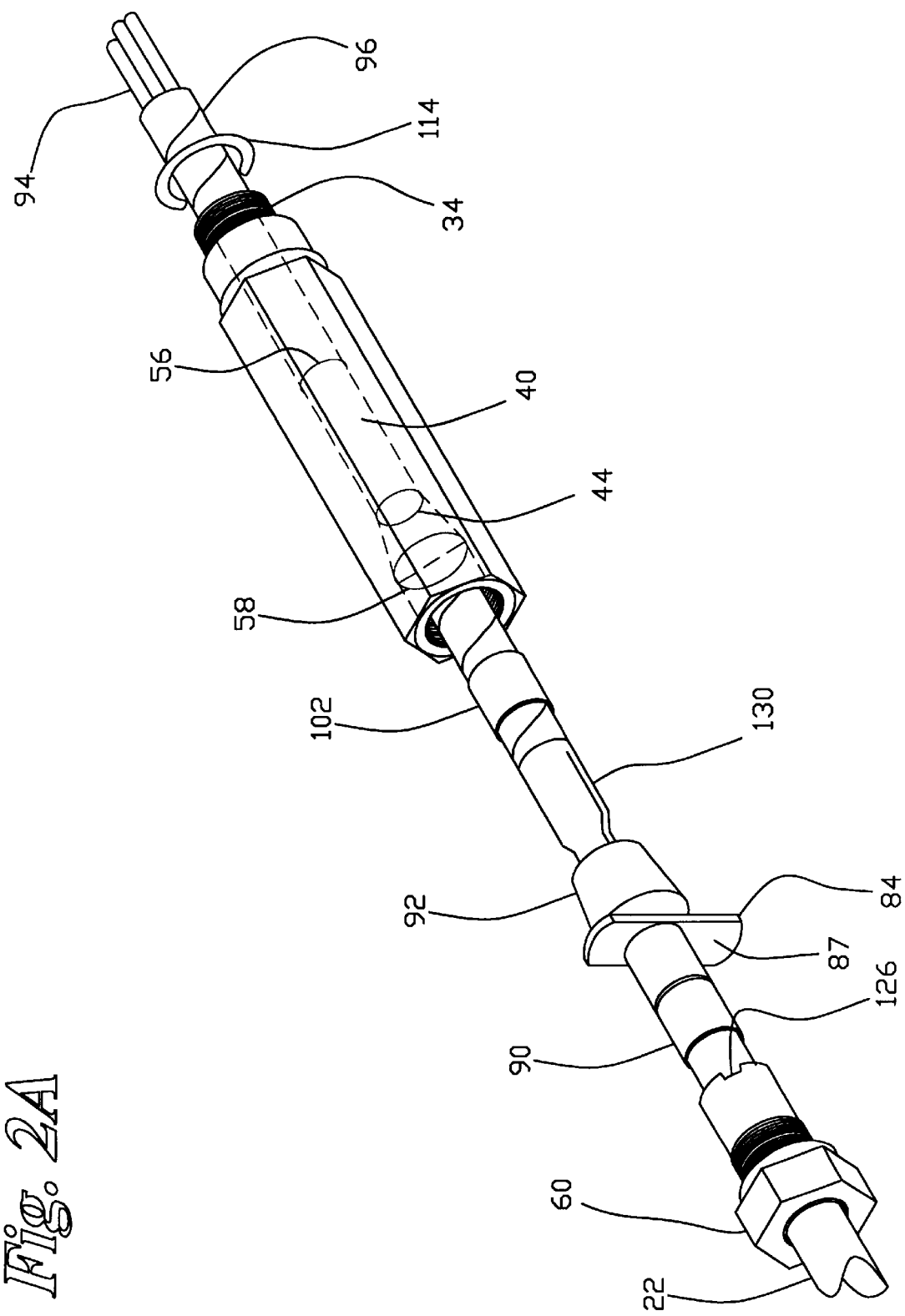
FIG. 2A is a perspective view of an embodiment of the fiber optic stub assembly of the present invention.
Figure 2B:
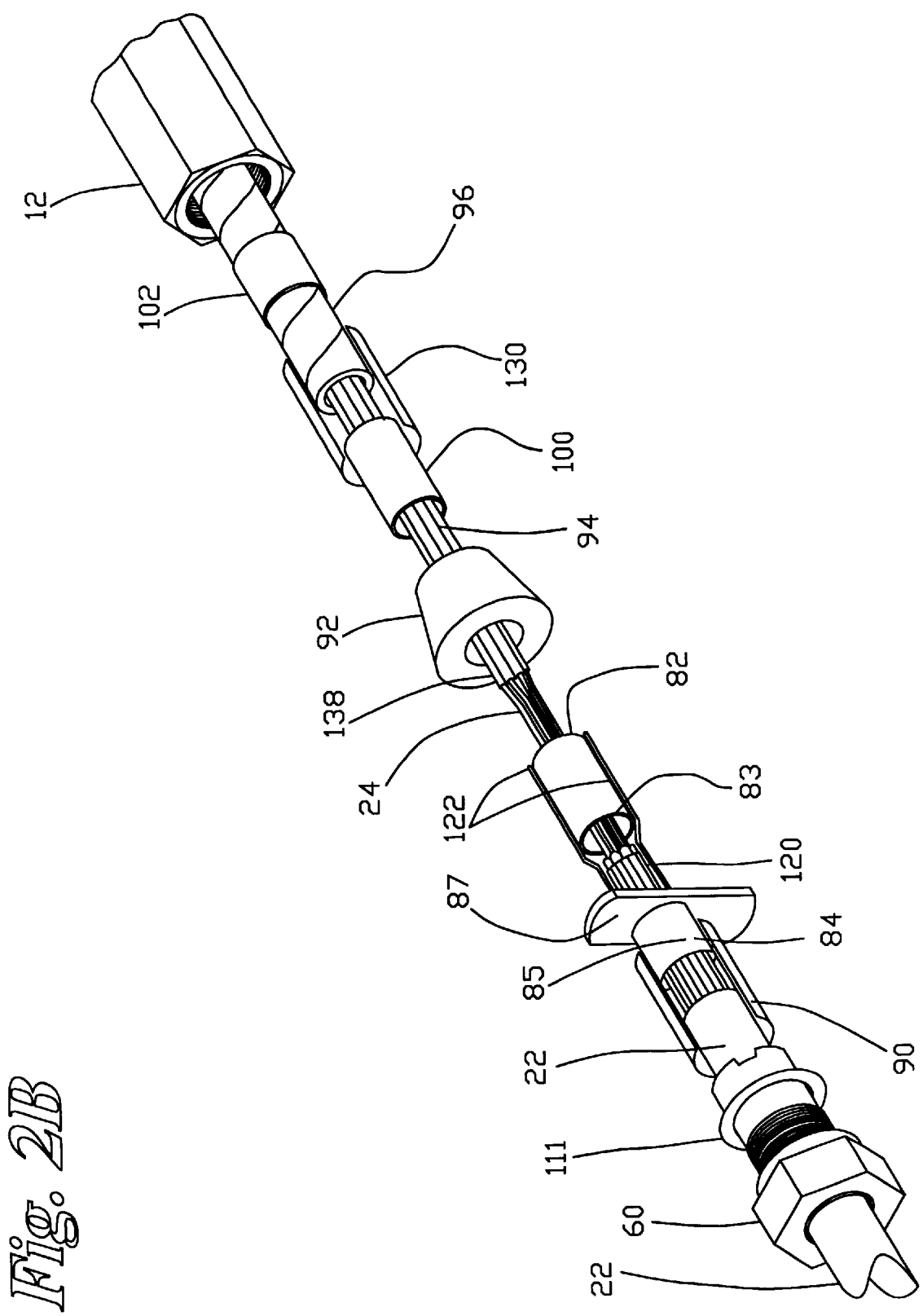
FIG. 2B is a perspective view of an embodiment of the fiber optic stub assembly of the present invention.

The present invention as generally shown in FIGS. 1, 2A, and 2B illustrates an embodiment of a fiber optic cable assembly in accordance with the invention. In particular, the sectional view in FIG. 1 shows a fiber optic stub assembly 10 in a disassembled state. FIGS. 2A and 2B show the fiber optic stub assembly 10 partially assembled.

The assembly 10 includes an optic stub illustrated as an elongated housing 12 having a front end 14, a back end 16, and an axial bore 18 extending between the front end 14 and the back end 16. The elongated housing 12 may be generally tubular in shape. Generally, the elongated housing 12 may be made of a rigid material, such as metal. Other materials may be used that are of a flexible nature, such as plastic.

The assembly 10 is designed to connect a fiber optic cable 20 to an optoelectronic system. The fiber optic cable 20 may be contained within, for example, a cable jacket 22 having numerous fibers 24 protruding from the cable jacket 22. In a preferred embodiment, the fibers 24 may be primary coated fibers that are furcated. The cable jacket 22 may be stripped in order to allow the fibers 24 to extend beyond the jacket 22. However, other similar processes may be used to achieve this end result. The front end 14 of the elongated housing 12 is compatible with and fits into, for example, a port 30 of an optoelectronic system 32. To fit into the port 30, the front of end 14 may have threading 34 around an outer portion 38 of the housing 12. The threading 34 may be extended from a point at the front end 14 and a predetermined length of the outer portion 38. The front end 14 of the housing 12 guides the primary coated fibers 24 into the port 30. Generally, the outer portion 38 is stepped out to ensure an environmentally sealed fitting between the housing 12 and the optoelectronic system 32. This fitting is important so that the furcated fibers 24 are not damaged during the installation process.

The axial bore 18 further includes a first portion 40, a second portion 42, and an intermediate tapered portion 44 extending between the first portion 40 and the second portion 42. The first portion 40, the second portion 42 and the intermediate tapered portion 44 are positioned along a common axis 50. The first portion 40 extends from the front end 14 to a point 52 intermediate the length of the housing 12. The second portion 42 extends from the back end 16 to a second point 54 intermediate the length of the housing 12. The intermediate tapered portion 44 may be conical in shape. The conical shape provides a taper between the second portion 42 to the first portion 40. To this extent, the first portion 40 has a diameter 56 that is less than a diameter 58 of the second portion 42.

The second portion 42 is capable of receiving a cap 60. The cap 60 has a first end 62 and a second end 64. An external surface 66 of the cap 60 is decrementally stepped from the second end 64 to the first end 62. The first end 62 has a diameter 68 that is less than the diameter 58 of the second portion 42 of the elongated housing 12. The second end 64 has a diameter 72 that is larger than the diameter 58 of the second portion 42. The larger diameter 72 provides a stopping mechanism so that the cap 60 is not inserted too far into the elongated housing 12 which may result in damage to the fiber optic cable 20 or interfering with the intermediate portion 44.

FIG. 1 shows internal threading 76 around a section of the second portion 42 of the elongated housing 12. The threading 76 extends a predetermined length from an entry point 77 at the back end 16 to a point 78 within the second portion 42. The threading 76 allows the cap 60 to be radially inserted into the elongated housing 12. Other low force insertion methods may be used to secure the cap 60 into the elongated housing 12. For example, the cap 60 may be advanced forward into the housing 12 by a more resilient manner such as by a low insertion spring attachment. A passageway 80 extends through the cap 60 so that the fiber optic cable 20 can pass through.

In accordance with the assembly of the embodiment, the fiber optic cable 20 is inserted through the second end 64 of the cap 60 so that the furcated fibers 24 protrude beyond the first end 62. FIG. 2B illustrates an inner crimp sleeve 82 placed around a cable sub-unit 120. The cable sub-unit 120 contains the primary coated fibers 24. A rear edge 83 of the inner crimp sleeve 82 abuts the cable jacket sheath 22. Cable strength members 122 are typically provided between the fiber containing sub-unit 120 and jacket sheath 22. These strength members 122 are frequently comprised of aramid yarn. The strain relief 84 is a rigid sleeve including a strain relief having an outer crimp sleeve 85 and a load-bearing flange 87 on its forward edge. The outer crimp sleeve 85 may then be mechanically crimped in place over the inner crimp sleeve 82 with the strength members 122 captured therebetween. A shrink tubing 90 may then be placed around the proximal ends of the cable jacket sheath 22 and the strain relief 84. In this embodiment, the shrink tubing 90 is an epoxy-filled heat-shrink tubing and is secured to the cable jacket sheath 22 and substantially surrounding the strain relief 84 through a heating process. In an embodiment the load bearing flange 87 protrudes beyond the shrink tubing 90, as shown in FIG. 2A. Other processes may, of course, be implemented to secure the shrink tubing in place, such as light, moisture or even chemically induced processes, which are generally known to one having ordinary skill in the art. When shrunk, an epoxy lining of the shrink tubing 90 creates a moisture-resistant barrier between the cable sheath 22 and the strain relief 84. In some applications the present invention contemplates creating a water impervious barrier at normally encountered ambient pressure at or near the earth's surface.

In this embodiment, the cable sub-unit 120 protrudes beyond the forward flange 87 of the strain relief 84. A portion of the sub-unit jacket is removed leaving only a small portion of the sub-unit 120 protruding beyond the forward flange 87 as shown in FIG. 2B. The fibers 24 are protected within each sub-unit 120. The sub-unit 120 frequently contains a moisture-impervious gel-like matrix. The exposed primary coated fibers 24 are cleaned to remove excess gel filler from the sub-unit 120. Color-coded secondary buffer coating 138 is slid over each primary-coated fiber 24, resulting in buffer coated fibers 94. The buffer coating provides protection to the individual fibers 24 and enables easy identification. A second shrink tubing 100 may then be placed over the forward end of the sub-unit jacket 120 and the secondary buffer-coated fibers 94. The second shrink tubing 100 is, generally, epoxy-filled and is exposed to heat in order to shrink the tubing 100 around the fibers 24. Other alternative methods of securing the shrink tubing 100 as previously set forth may also be implemented.

In this embodiment, the shrink tubing 100 contracts over the fibers 24 and the secondary buffer-coated fibers 94. A function of the shrink tubing 100 is to bond the buffer coated fibers 94 (or buffer tubing) to the sub-unit jacket 120 and provide support and bend relief to the primary-coated fibers 24 which run therethrough. The cable jacket 22 with the outer crimp sleeve 84 and the shrink tubing 90 attached thereto is pulled back within the cap 60 so that an end of the forward flange 87 engages a recess 126 in the cap 60 to avoid rotation of the cable 20.

The primary coated fibers 24 are then threaded through a grommet 92. The grommet 92 is a donut-shaped member which fits within the intermediate portion 44 of the housing 12. To this extent, the grommet 92 is a frusto-conical shaped member. In alternative embodiments, the grommet 92 may be other shapes and sizes depending on the construction of the intermediate portion 44 of the elongated housing 12. The grommet 92 is preferably made of a rubber material but may be constructed from different materials having similar flexible characteristics. The fibers 24 extend through the grommet 92, and a buffer tubing 94 may be placed over each individual fiber 24. A spiral wrap 96 may be wrapped around the buffer tubing 94. A portion of the fibers 24 having the buffer tubing 94 may be wrapped with a third shrink tubing 130. The third shrink tubing 130 extends over the second shrink tubing 100. The third shrink tubing 130 may also be epoxy-filled and may be exposed to heat in order to shrink the tubing 130 around the fibers 24, the buffer tubing 94 and the second shrink tubing 100.

An O-ring 102 may be placed over the spiral wrap 96, and the fibers 24 are threaded into the back end 16 of the elongated housing 12 and out through the front end 14 of the elongated housing 12. An O-ring 111 may be used to provide a further seal between the cap 60 and housing 12 to reduce the risk of moisture, dust or dirt from entering the assembly 10. The O-ring 111 is positioned between the optic cap 60 and the housing 12.

The threading of the fibers 24 through the elongated housing 12 causes the grommet 92 to be located within the intermediate portion 44 of the housing 12. The cap 60 is then radially inserted within the back end 16 of the housing 12. In the embodiment illustrated, external threading 110 is provided around the first end 62 of the cap 60 that engages with the internal threading 76 of the housing 12. The cap 60 is screwed into the optic stub housing 12 to compress the grommet 92 against the intermediate portion 44 of the housing 12 and provide a surface-to-surface seal.

The grommet 92 functions as another water barrier to the front end 14 of the housing 12. The third shrink tubing 130 fits snugly within a hole 112 of the grommet 92 so that a water-resistant barrier is formed. An O-ring 114 may then be placed at the front end 14 of the housing 12. The O-ring 114 centers the stripped fibers 94 extending beyond the front end 14 of the housing 12 within the axial bore 18. The O-ring 114 also provides a water resistant seal at the front end 14 of the housing 12. In an alternative embodiment, the O-ring 114 may be replaced by injecting epoxy or a silicon rubber in the front end 14 of the housing 12 to center the stripped fibers and to provide the water resistant seal at the front end 14 of the optic stub housing 12.

Figure 3:
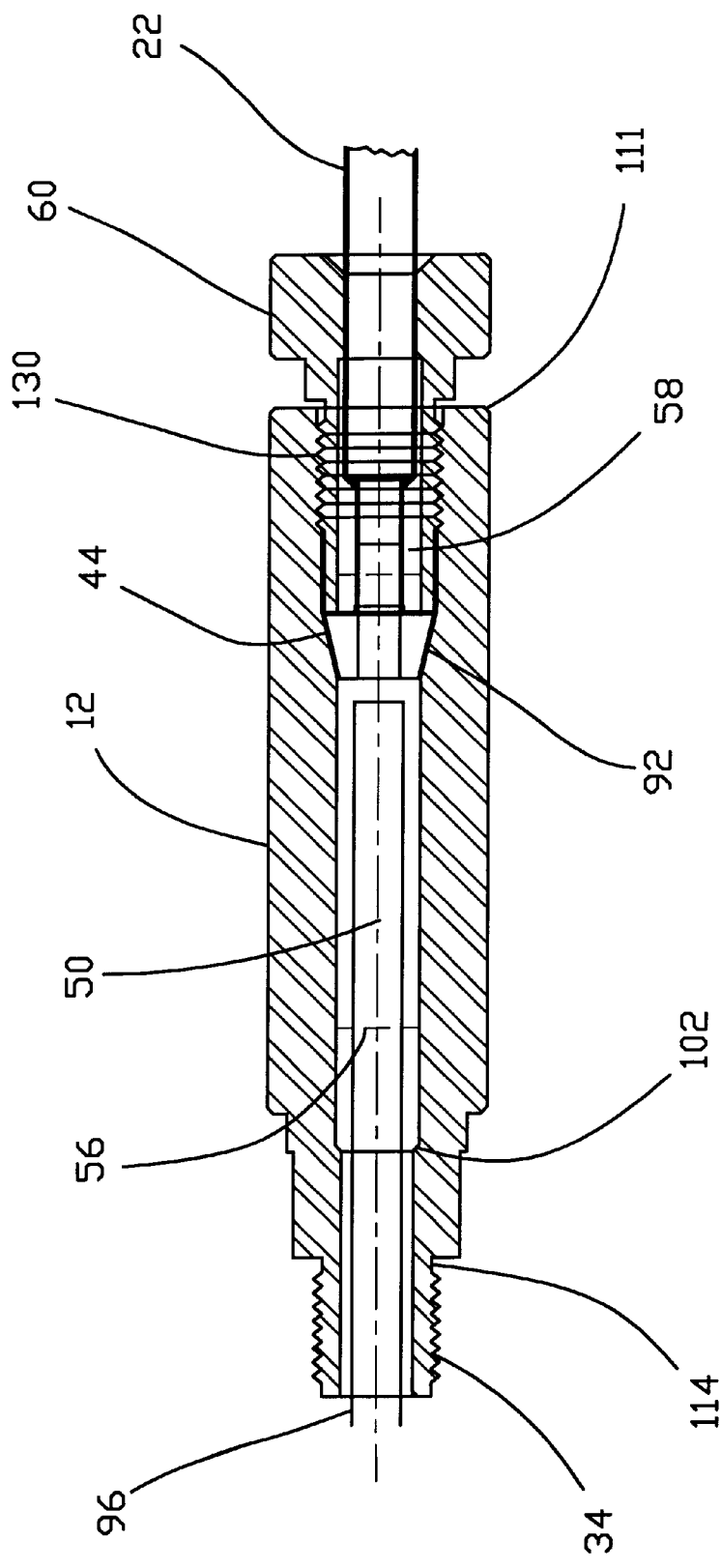
FIG. 3 is a cross-sectional view of an embodiment of the fiber optic stub assembly of the present invention.

FIG. 3 illustrates the fiber optic stub cable assembly 10 in an assembled state. The cap 60 is secured to the housing 12. The grommet 92 is compressed against the intermediate portion 44 of the housing 12 and formed around the third heat shrink tubing 130, thus providing a water resistant barrier.

The entire assembly may then be attached to the closed optoelectronic system 32 by screwing the external threading 34 at the front end 14 of the housing 12 into the port 30 of the system 32 as shown in FIG. 4. In an embodiment, the entire fiber optic stub assembly 10 may be covered with a heat-shrink tubing (not shown).

It is seen that this invention provides a novel fiber optic stub cable assembly and method for manufacturing the same. It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims. For example, the present invention may not only provide a barrier to water, but also other liquids including water mixtures.

I claim:

1. A fiber optic cable assembly comprising:
an elongated housing having a front end, a back end and an axial bore extending between the front end and the back end, the axial bore of non-uniform diameter;
a cap fitted into the back end of the elongated housing;
a fiber optic cable contained within a cable jacket and having furcated fibers protruding from a distal portion of the cable jacket the fibers having a mediate span defined by the furcated fibers not enclosed by the cable jacket and a rigid sleeve thereon wherein the fiber optic cable is constructed and arranged within the cap and the elongated housing, the rigid sleeve including a strain relief for strain relieving the cable at the mediate span; and
a first water resistant barrier surrounding the rigid sleeve and the distal portion of the cable jacket.

2. The fiber optic cable assembly of claim 1 wherein the rigid sleeve is a strain relief secured to the fiber optic cable.

3. The fiber optic cable assembly of claim 1 further comprising:
a second water resistant barrier positioned adjacent the rigid sleeve on an opposed side of the rigid sleeve to the first water resistant barrier.

4. The fiber optic cable assembly of claim 1 wherein the first water resistant barrier includes a shrink tubing disposed around the rigid sleeve and the fiber optic cable.

5. The fiber optic cable assembly of claim 4 wherein the shrink tubing is disposed around the fiber optic cable.

6. The fiber optic cable assembly of claim 1 further comprising:
a spiral wrapped around the fibers;
a second shrink tubing disposed around the fibers; and
a third shrink tubing disposed around the spiral wrap and the second shrink tubing wherein the spiral wrap, the second shrink tubing and the third shrink tubing form a second water resistant barrier forward of a rigid sleeve.

7. The fiber optic cable assembly of claim 1 further comprising:
a grommet constructed and arranged within an intermediate stepped portion; and a second shrink tubing disposed around the fibers, the second shrink tubing disposed around the fibers, and the second shrink tubing positioned within the grommet.

8. The fiber optic cable assembly of claim 1 wherein the rigid sleeve is a strain relief that is crimped to the cable and includes a means for providing a stop abutment for the cap.

9. The fiber optic cable assembly of claim 8 wherein the stop abutment means includes a flange.

10. The fiber optic cable assembly of claim 1 wherein the axial bore of the elongated housing includes a first portion, an intermediate tapered portion and a second portion.

11. The fiber optic cable assembly of claim 1 wherein the first water resistant barrier also provides a water impervious barrier.

12. The fiber optic cable assembly of claim 11 wherein the water impervious barrier is provided in terrestrial environments.

13. A method for assembling a fiber optic stub fitting, the method comprising the steps of:
providing a fiber optic cable so that fibers extend beyond an end of a cable jacket;
providing a cap;
providing a rigid sleeve;
furcating said fibers to form a mediate span;
inserting the fibers through the cap and the rigid sleeve;
providing a first shrink tubing disposed around the cable jacket and the rigid sleeve at the mediate span;
providing an optic stub housing; and
inserting the fibers through the optic stub housing creating a first water resistant barrier within the optic stub housing.

14. The method according to claim 13 further comprising the steps of:
providing a second shrink tubing disposed around a second portion of the fibers.

15. The method according to claim 13 further comprising the steps of:
providing a spiral wrap around the fibers; and
providing a second shrink tubing disposed around the fibers creating a second water resistant barrier.

16. The method according to claim 13 further comprising the steps of:
providing a grommet;
preparing a second shrink tubing disposed around a second portion of the fibers;
positioning the second shrink tubing within the grommet; and
compressing the grommet within the optic stub housing forming a water resistant barrier.

17. The method according to claim 13 further comprising the step of:
compressing a grommet against an intermediate portion of the optic stub housing.

18. The method according to claim 13 further comprising the steps of:
positioning an o-ring around the cap; and
inserting the cap within the optic stub housing.

19. The method according to claim 13 further comprising the step of:
crimping the plurality of fibers and the cable jacket.

20. The method according to claim 13 further comprising the step of:
positioning an inner crimp sleeve around the fibers and under the strength members;
positioning an outer crimp sleeve over the strength members and the fibers; and
crimping the the outer crimp sleeve over the strength members and strain reliving the cable.

21. The method according to claim 13 further comprising the step of:
placing buffer tubing over each of the fibers.

22. The method according to claim 13 further comprising the steps of:
placing buffer tubing over each of the fibers; and
wrapping spiral wrap around the buffer tubing.

23. A fiber optic cable assembly comprising:
an optic stub housing having an axial bore extending through the housing;
a fiber optic cable contained within a cable jacket and having fibers protruding therefrom;
a mediate span where primary coated fibers are furcated from the cable subunit with a plurality of secondary buffer coatings;
a water resistant barrier in the axial bore wherein the water resistant barrier encases the mediate span and the plurality of secondary buffer coatings;
a strain relief applied generally at the mediate span; and
a cap inserted into the axial bore adjacent to the water-resistant barrier.

24. The fiber optic cable assembly of claim 23 further comprising:
an intermediate portion constructed and arranged within the axial bore; and
a grommet positioned in the intermediate portion.

25. The fiber optic cable assembly of claim 23 further comprising:
a grommet constructed and arranged within the axial bore; and
a shrink tubing disposed around the fibers and positioned within the grommet.

26. The fiber optic cable assembly of claim 23 wherein the cable includes a water impervious barrier at average ambient pressure at sea level.

27. A fiber optic cable assembly comprising:
a housing having an axial bore extending therethrough;
a fiber optic cable having a mediate span including furcated primary coated fibers;
a first water resistant barrier at a first end of the mediate span;
a second water resistant barrier at a second end of the mediate span; and
the mediate span insertable within the housing.

28. The fiber optic cable assembly of claim 27 wherein the first water resistant barrier includes a strain relief sleeve mounted at the first end of the mediate span of the cable and partially encased by a shrink tubing.

29. The fiber optic cable assembly of claim 28 wherein the strain relief sleeve includes a load bearing flange exposed above the shrink tubing.

30. The fiber optic cable assembly of claim 27 wherein the second water resistant barrier includes a spiral wrap surrounding the second end of the mediate span, a second shrink tubing surrounding the spiral wrap.

31. The fiber optic cable assembly of claim 27 wherein a grommet is disposed about the cable adjacent the second end and abuts against a flange of a load bearing sleeve mounted to the cable.

32. The fiber optic cable assembly of claim 27 wherein the fiber optic cable includes a water impervious barrier.

33. The fiber optic cable assembly of claim 32 wherein the water impervious barrier is comprised of shrink tubing surrounding a strain relief sleeve.

* * * * *